Oct. 12, 1965       I. M. DAVIDSON       3,211,398
HELICOPTERS
Filed Sept. 3, 1963

Ivor Macaulay Davidson
Inventor
By
Stevens, Davis, Miller & Mosher
Attorneys

3,211,398
HELICOPTERS

Ivor Macaulay Davidson, Farnborough, England, assignor to Power Jets (Research and Development) Limited, London, England, a British company
Filed Sept. 3, 1963, Ser. No. 306,260
Claims priority, application Great Britain, Dec. 12, 1961, 44,403/61
6 Claims. (Cl. 244—17.19)

The present application is a continuation-in-part of application Serial No. 240,501, filed Nov. 28, 1962, now abandoned, in the name of the present applicant.

This invention relates to helicopters, and particularly through not exclusively to aircraft of the "convertiplane" type. The term "convertiplane" is herein used to designate an aircraft which is capable of forward flight in conventional manner when it is supported by aerodynamic lift on its wings, and is also capable of operation as a helicopter when it is supported by its helicopter rotor.

Specifically, the invention is concerned with the aircraft described in copending applications Serial Nos. 77,091 (Cheeseman and Moss) filed Dec. 20, 1960 (now Patent No. 3,096,041), 184,305 (Davidson and Cheesman), now Patent No. 3,109,494, and 184,306 (Davidson), now Patent No. 3,163,376, both filed Apr. 4, 1962. Each of these applications describes an aircraft of the convertiplane type which is able to take off vertically as a helicopter. As forward speed is gained, the aircraft weight is progressively transferred from the helicopter rotor to the wings, and eventually the whole of the aircraft weight is supported by aerodynamic lift on the wings, the rotor then being brought to rest and partly or wholly retracted into the fuselage or other stationary structure of the aircraft. Similarly for landing, the rotor is extended and as forward speed is reduced, the aircraft weight is transferred from the wings to the rotor, after which hovering and vertical landing as a helicopter becomes possible.

For control of the aircraft referred to in forward flight, conventional control surfaces, that is ailerons, elevators and rudder are provided, but these of course become ineffective in low speed and hovering flight. Under these conditions, control in pitch and roll is effected by cyclic variation of the momenta of fluid streams discharged over the outer surfaces of the rotor blades. The present invention makes provision for effecting directional control, i.e., control in yaw.

Such control is effected by treating the fuselage of the aircraft as an aerofoil in the downwash flow from the rotor, and discharging one or more fluid streams over the fuselage outer surface in such a way as to produce lift forces thereon acting in a sideways direction, that is, normal to the downwash flow.

Thus according to the invention, an aircraft comprises a fuselage and a helicopter rotor rotatably mounted on top of the fuselage, wherein the fuselage is formed in its surface with at least two lengthwise-extending apertures, one being disposed forwardly of the rotor head and one to the rear of the rotor head and located so that, when the rotor is rotating, they lie within the downwash flow over the fuselage, and shaped and directed to discharge the fluid streams as thin layers tangentially over the fuselage outer surface in such a direction in relation to the downwash flow as to give rise to lift forces on the fuselage acting in sideways directions.

The apertures may be shaped and directed to discharge fluid streams downwardly over side surfaces of the fuselage.

Preferably the fuselage is formed with at least two pairs of apertures, the apertures of each pair being arranged one on each side of the fuselage and being shaped and directed to discharge the fluid streams downwardly over the opposite side surfaces of the fuselage. There may be provided a control operable to supply fluid selectively to opposite apertures or to vary the discharge from opposite apertures in opposite senses with provision for supplying fluid to the forward apertures on one side of the fuselage and the rearward apertures on the other side. In this way sideways acting forces can be applied to the fuselage for turning the aircraft or moving it bodily in a sideways direction.

An embodiment of the invention will now be described by way of example with reference to the accompanying drawings, of which:

Figure 1:
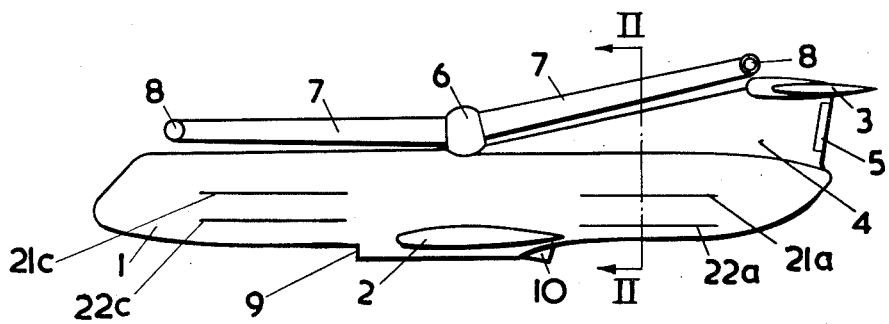
FIGURE 1 is a side view of an aircraft of the convertiplane type.

The aircraft of FIGURE 1 is essentially the same as that described in said application Serial No. 184,306. It comprises a fuselage 1, wings 2, tailplane 3, and fin 4 mounted on top of the fuselage and carrying rudder 5. Rotatably mounted on top of the fuselage is a two-bladed helicopter rotor comprising a rotor head 6, rotor blades 7 of circular or substantially circular cross-section and tip jet units 8 on the extremities of the blades. The aircraft is powered by gas turbine jet propulsion engines of the by-pass type mounted within the fuselage, the engines being connected to draw in air through intakes 9 and to discharge their propulsive jet streams through rearwardly directed jet pipes 10 so as to produce forward thrust on the aircraft.

Jet deflectors are provided for diverting the jet streams from the jet pipes to the interior of the rotor head and thence through the rotor blades to the tip jet units. The by-pass compressors of the engines can also be connected to long narrow spanwise-extending discharge apertures in the surfaces of the blades arranged to discharge air streams tangentially over the blade outer surfaces as thin layers. Possible arrangements of these apertures are disclosed in said applications Serial Nos. 77,091 and 184,305. The rotor is mounted as described in said application Serial No. 184,306 for bodily movement along its rotational axis between the operative position shown in FIGURE 1 in which it can rotate clear of the structure of the aircraft and an inoperative position in which it is partly retracted into the stationary structure, one blade lying in a recess in the top of the fuselage 1 extending forwardly from the rotor head and the other lying in a recess 11 in the edge of the fin 4 (see FIGURE 2) extending rearwardly from the rotor head.

On take-off, the rotor is raised to its operative position, the jet deflectors are operated so that the engine jet streams are diverted to the tip jet units whereby the rotor is driven, and compressed air is supplied to the apertures in the blades. The arrangement of the apertures is such that the thin layers of air discharged over the blade outer surfaces have a circulation control effect whereby lift is induced on the blades when the rotor is rotating and the aircraft is able to rise vertically. The aircraft is then tilted to obtain some forward motion, and with increasing forward speed the aircraft weight is transferred to the wings. Eventually the jet deflectors are reversed so that the jet streams are discharged rearwardly, and the rotor can be stopped and retracted. For landing a reverse sequence of operations is carried out.

The momenta of the air streams discharged from the apertures in the blades is varied cyclically in accordance with the rotation of the rotor, for example, by a control mechanism operable to vary the width of the apertures as described in said application Serial No. 184,305. By varying the phase relationship between aperture width and rotor rotation the aircraft can be controlled in pitch and roll when hovering and in low speed flight.

Figure 2:
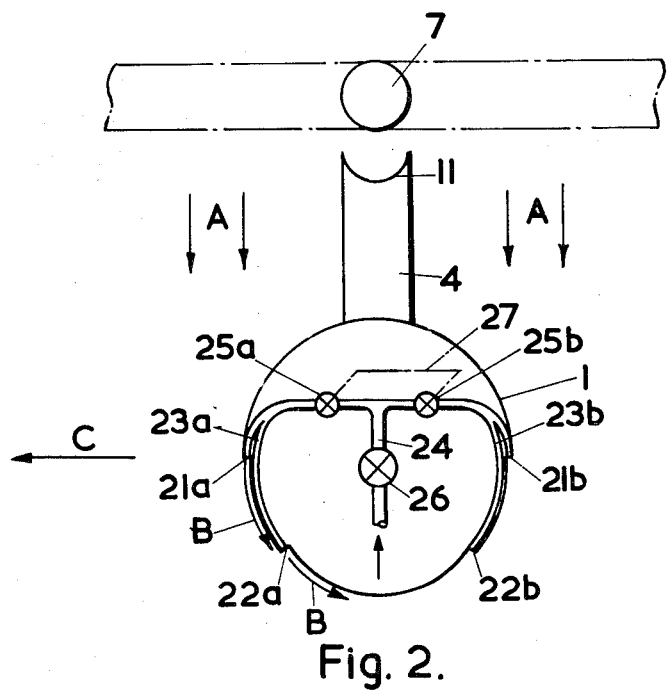
FIGURE 2 is a diagrammatic transverse section through the aircraft, taken on the line II—II in FIGURE 1.

Reference is now made to FIGURE 2 which shows the fuselage 1, which is circular or substantially circular in transverse cross-section, formed in its surface with long narrow apertures 21a, 21b, 22a, 22b for the discharge of air extending along part of its length to the rear of the rotor head and wings. Corresponding apertures are formed in the surface of the fuselage forwardly of the rotor head and wings as at 21c, 22c in FIGURE 1. The apertures 21a, 21b are located on opposite sides of the fuselage substantially at its maximum width, and are shaped and directed to discharge air streams as thin layers tangentially over the opposite side surfaces of the fuselage in a downwards direction. The apertures 22a, 22b are located in the side surfaces of the fuselage nearer to the bottom thereof and are similarly arranged to discharge thin layers of air over the rounded underside surface of fuselage downwadly and inwardly towards one another. The spacing between apertures 21a and 22a and between apertures 21b and 22b may typically be 40° to 60°. In the drawings, the depth of the apertures has been considerably exaggerated for the sake of clarity.

FIGURE 2 also shows schematically the air supply system for the apertures in the rear part of the fuselage. The apertures 21a, 22a and 21b, 22b are supplied by ducts 23a, 23b branched from a common supply duct 24 which is connected to a source of compressed air, for example, the by-pass compressors of the engines. The ducts 23a, 23b, 24 incorporate control valves 25a, 25b, 26 respectively. A precisely similar arrangement is used to supply air to the apertures in the front part of the fuselage.

The fuselage 1 together with the fin 4 mounted thereon may be regarded as an aerofoil with a rounded or blunt trailing edge lying in the downwash flow A from the rotor. If air is supplied to aperture 21a, 22a the layers of air discharged downwardly therefrom over the port side of the fuselage as indicated by arrows B have a circulation control effect giving rise to a lift force normal to the downwash flow, acting in a sideways direction as indicated by arrow C. This force acts to the rear of the centre of gravity of the aircraft, and so the aircraft is turned to starboard.

Simiarly by discharging air through apertures 21b, 22b a turn to port may be effected.

At the forward part of the fuselage the turning effect of the lift forces is of course in the opposite sense due to their acting forwardly of the centre of gravity i.e. air discharge over the port side of the fuselage will produce a turn to port.

When air is discharged simultaneously from front and rear apertures in one side of the fuselage only the lift forces act in the same direction to give bodily sideways movement.

It is contemplated that control of the air discharge from the fuselage apertures will be effected by the conventional pilot's rudder bar or pedals which will be connected to open valve 25a or valve 25b together with the opposite valve in the forward part of the fuselage so that air is supplied selectively to apertures 21a, 22a or 21b, 22b and the diagonally opposite apertures in the front part of the fuselage, depending upon which way the aircraft is to be turned. The valves may be linked as indicated at 27 so that the valve opening and hence the air supply to and the discharge from the opposite apertures may be varied in opposite senses.

The valves controlling air discharge to the apertures in the front and rear sections of the fuselage may also be linked so that both valves on one side of the fuselage are opened together and air is thereby discharged in the same sense from the front and rear apertures on that side of the fuselage simultaneously.

When the aircraft goes into forward flight the rudder 5 becomes effective at a forward speed at which the downwash flow over the rear of the aircraft is substantially rearwards rather than downwards. In these conditions the air streams from the fuselage apertures are ineffective to produce a sideways force, and so the supply to the apertures can be cut off by means of valve 26 at any convenient stage in the flight plan, for example, when the supply of air to the apertures in the rotor blades is discontinued, without affecting the control of the aircraft.

The lengthwise extent of the fuselage apertures will depend upon the design of the aircraft and the magnitude of the yaw control forces required though they must of course be within the downwash flow over the fuselage when the rotor is rotating.

Various alternative arrangements of fuselage apertures are possible; thus in some cases the apertures 22a, 22b could be omitted while in others additional apertures in the side surfaces of the fuselage, both above and below apertures 21a, 21b might be required, the apertures in each case discharging downwardly.

In any of the embodiments described, each aperture may be constituted by a long narrow slot or a series of slots, or by an equivalent row of closely spaced holes.

While the invention has been particularly described in relation to a convertiplane as described in said application Serial No. 184,306, it could also be applied to any of the aircraft described in the applications referred to. It is believed that the invention would also find application in other forms of convertiplane and in helicopters generally.

I claim:

1. An aircraft comprising a fuselage; a helecopter rotor mounted on top of the fuselage; a rotor head positioned substantially mid-way along the fuselage; the fuselage being formed in its surface with at least two pairs of opposite lengthwise-extending apertures located so that when the rotor is rotating they lie within the rotor downwash flow over the fuselage, one pair being disposed forwardly of the center of gravity of said aircraft and one pair to the rear of said center of gravity, the apertures of each pair being arranged one on each side of the fuselage; and means for supplying fluid to said apertures; said apertures being shaped and directed to discharge streams of said fluid tangentially and downwardly over opposite side surfaces of the fuselage.

2. An aircraft according to claim 1 further comprising a control operable to supply fluid selectively to the opposite apertures.

3. An aircraft according to claim 1 further comprising control means operable to supply fluid simultaneously to apertures at the same side of the fuselage.

4. An aircraft according to claim 3 further comprising control means operable to supply fluid selectively to apertures at opposite sides of the fuselage.

5. An aircraft according to claim 1 wherein the opposite apertures are located substantially at the maximum width of the fuselage.

6. An aircraft according to claim 5 wherein the fuselage has a rounded undersurface and is formed in its surface with a further lengthwise-extending aperture between each of said first-mentioned apertures and the bottom of the fuselage, said further apertures being connected to sail fluid supply means and being shaped and directed to discharge streams of said fluid downwardly and inwardly tangentially over the rounded underside surface of the fuselage.

References Cited by the Examiner

UNITED STATES PATENTS

| 2,344,515 | 3/44 | Massey | 244—21 |
| 2,984,255 | 5/61 | Kaltzenberger | 244—7 X |
| 2,989,268 | 6/61 | Andrews | 244—7 |
| 3,059,877 | 10/62 | Lee | 244—17.19 |

FERGUS S. MIDDLETON, *Primary Examiner.*